May 6, 1941.  W. A. ANDERSON  2,241,173
PAPER HOLDING AND FEEDING MECHANISM FOR ACCOUNTING MACHINES
Filed Dec. 29, 1939  3 Sheets-Sheet 1

INVENTOR
WALTER A. ANDERSON
BY
ATTORNEY

PAPER HOLDING AND FEEDING MECHANISM FOR ACCOUNTING MACHINES

INVENTOR
WALTER A. ANDERSON
BY
ATTORNEY

Patented May 6, 1941

2,241,173

UNITED STATES PATENT OFFICE 2,241,173

PAPER HOLDING AND FEEDING MECHANISM FOR ACCOUNTING MACHINES

Walter A. Anderson, Bridgeport, Conn., assignor to Underwood Elliott Fisher Company, New York, N. Y., a corporation of Delaware Application December 29, 1939, Serial No. 311,575

10 Claims. (Cl. 197—128)

This invention relates to accounting machines, and more particularly to a front feed paper supporting and feeding apparatus therefor.

It is customary in utility company accounting to render the monthly bills with detachable stubs, and upon the consumer making payment, to insert the stub in the accounting machine, post the amount of the payment thereon, and return the stub to the customer as a receipt. In instances where the consumer pays the entire amount represented by the bill, this is indicated by a printing of ".00" in the Balance column, but in instances where a company such as, for example, a telephone company, itemizes its charges, as for example, for toll service, local service, advertising, etc., the consumer may pay one or more of these charges and leave the others unpaid. In this event the total amount due is posted, as a debit, in one column of the stub, the individual charges which the consumer pays are posted on separate lines, as credits, in another column, and the total of the unpaid charges is printed in a third column. The stubs upon which these amounts are posted are usually pre-printed with a definite line at the bottom thereof for the printing of the balance due.

It is accordingly an object of the present invention to provide a paper supporting and feeding apparatus that permits easy insertion and location of a stub form in position for the printing of the first debit posting and which automatically advances the stub from line to line as the credits are posted.

Another object of the invention is to automatically advance the stub from the last credit posting line directly to the line for receiving the printing of the balance due, irrespective of the number of lines of credit postings previously printed.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

In the drawings:

Figure 4 is a detail perspective view of a cam member that controls the restoration of certain of the control elements during carriage return.

The description is divided into the following topics:

1. The carriage generally.
2. Paper supporting mechanism.
3. Line spacing mechanism.
4. Multiple line space advancement of forms by carriage control.
5. Restoring mechanism.
6. Operation.

1. The carriage generally

The carriage is of the type disclosed in the United States application of Oscar J. Sundstrand, Serial No. 581,800, now Patent No. 2,194,270, issued March 19, 1940, and is mounted upon an accounting machine (not shown) of the general character disclosed in that application.

Figure 1:
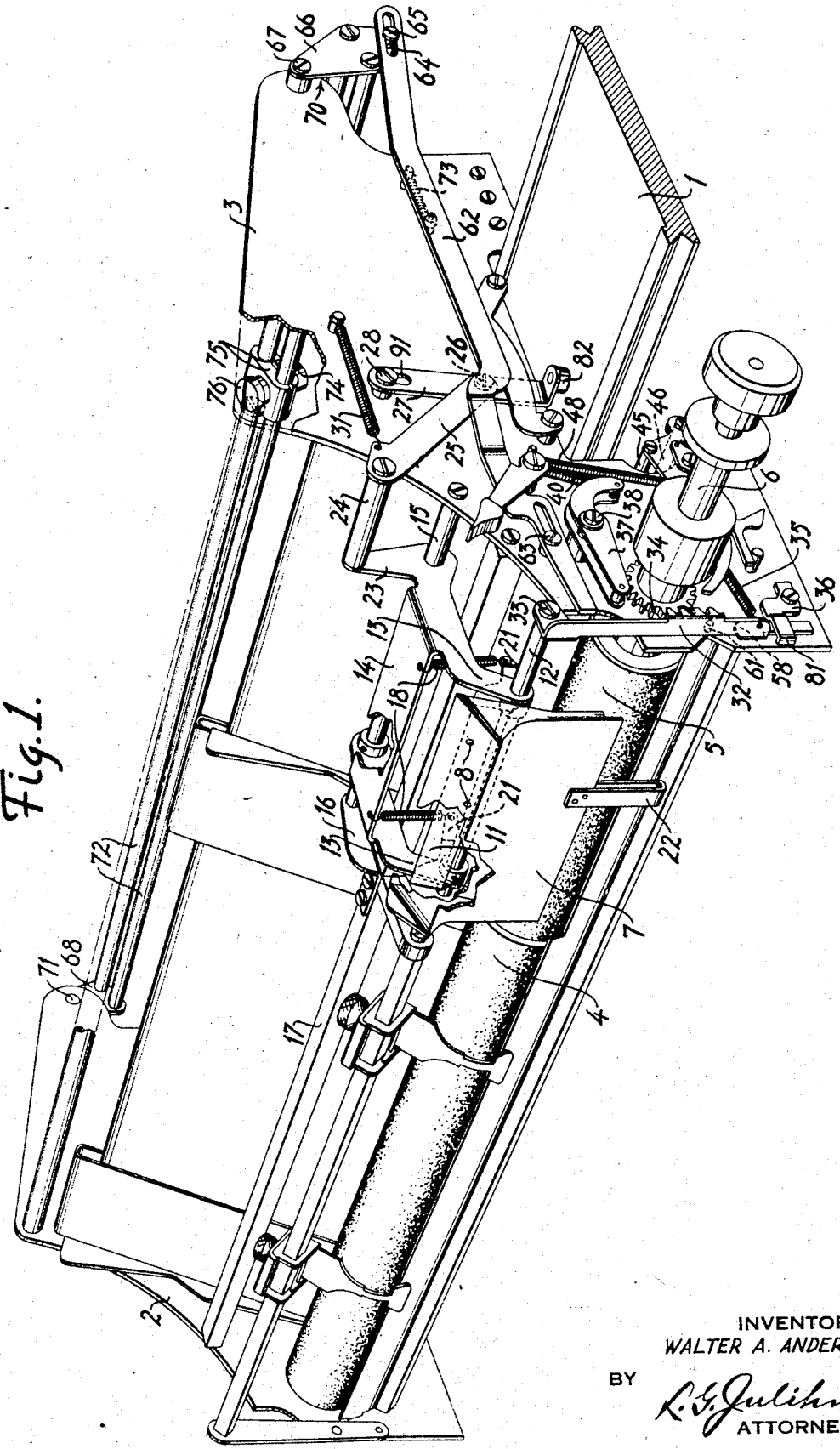
Figure 1 is a perspective view of a paper carriage equipped with the invention.

Referring to Figure 1, the carriage is movable laterally of the machine on a track 1, there being suitable means provided to drive it from right to left on what is known as a working stroke, and to automatically return it from its extreme left hand position to its extreme right hand position on what is known as a return stroke. During the working stroke the carriage is tabulated from column to column by suitable control magazines cooperating with tabulating stops, in the manner disclosed in the aforementioned application.

The carriage includes spaced parallel side walls 2 and 3 between which are mounted separate platens 4 and 5 upon a shaft 6. Platens 4 and 5 are arranged for independent rotation by means that may be similar to those disclosed in United States Patent No. 2,084,519. The details of construction of the platen shafts and the manner in which the platens are secured thereto may be similar to the construction disclosed in United States Patent No. 1,708,284 or No. 1,880,220.

In the present embodiment of the invention, platen 4 is used for supporting and feeding a rear fed ledger or record sheet upon which are printed summary totals of amounts printed upon the individual stub forms that are fed upwardly in front of platen 5 in a manner to be explained, and with which we are primarily concerned.

2. Paper supporting mechanism

The mechanism for receiving and supporting the stub forms comprises a chute 7 located directly in front of and above platen 5. The back of the chute is secured as at 8 to a bail 11 pivoted at its opposite ends on a transversely extending rod 12 that is pivoted in depending arms 13 of a cradle 14. Cradle 14 is pivoted on a rod 15 extending between the right carriage side wall 3 and a bracket 16 fixed on a square rod 17 secured between carriage side walls 2 and 3. Springs 18, connected between cradle 14 and rearwardly extending arms 21 formed on bail 11, tension the bail and chute 7 counter-clockwise about rod 12 and hold the rear leg of a U-shaped member 22, that is secured to chute 7, against platen 5. The member 22 defines the bottom of chute 7 and provides a stop for the bottom edge of the stub forms that are inserted in the chute. An upstanding projection 23 formed on the right side of cradle 14 carries a laterally extending rod 24, on the outer end of which is pivoted a link 25. The opposite end of link 25 is pivoted at 26 to a lever 27 pivoted at 28 on side wall 3 for a purpose to be later described.

A spring 31, connected between the upper end of link 25 and side wall 3, normally tensions cradle 14, bail 11 and chute 7 as a unit clockwise about rod 15, but this unit is normally held against such clockwise movement by a depending rack 32 pivoted at 33 to the right end of rod 12 and having teeth thereon engaging the teeth of a ratchet wheel 34 fixed on platen shaft 6. A spring 35, connected between the lower end of rack 32 and the carriage side wall 3, tensions the rack into engagement with the ratchet. A guide 36 embraces the lower end of the rack to limit movement of the rack toward the ratchet from the tension of spring 35, and to prevent side play of the rack. A roller detent 37, pivoted at 38 and held in engagement with ratchet wheel 34 by a strong spring 40, holds the chute and cradle unit in the position shown in Figure 1 against the tension of spring 31, until a line space operation is performed, as about to be described.

3. Line space mechanism

Conventional line space mechanism similar to that disclosed in the aforementioned application is embodied in this invention to line space platen 5, and also to line space the stub forms inserted in chute 7.

Briefly, this mechanism includes a bell crank 41 (Figure 2) pivoted at 42 and connected at 43 to the upper end of a link 12. Link 12 corresponds to link 652 in application Serial No. 581,800, and, as disclosed in that application, is arranged to similarly oscillate bell crank 41, first counter-clockwise from the normal position shown in Figure 4, and then clockwise back to normal position, during each cycle of the machine. A roller 44 on the upper arm of bell crank 41 receives a corresponding movement.

Figure 2:
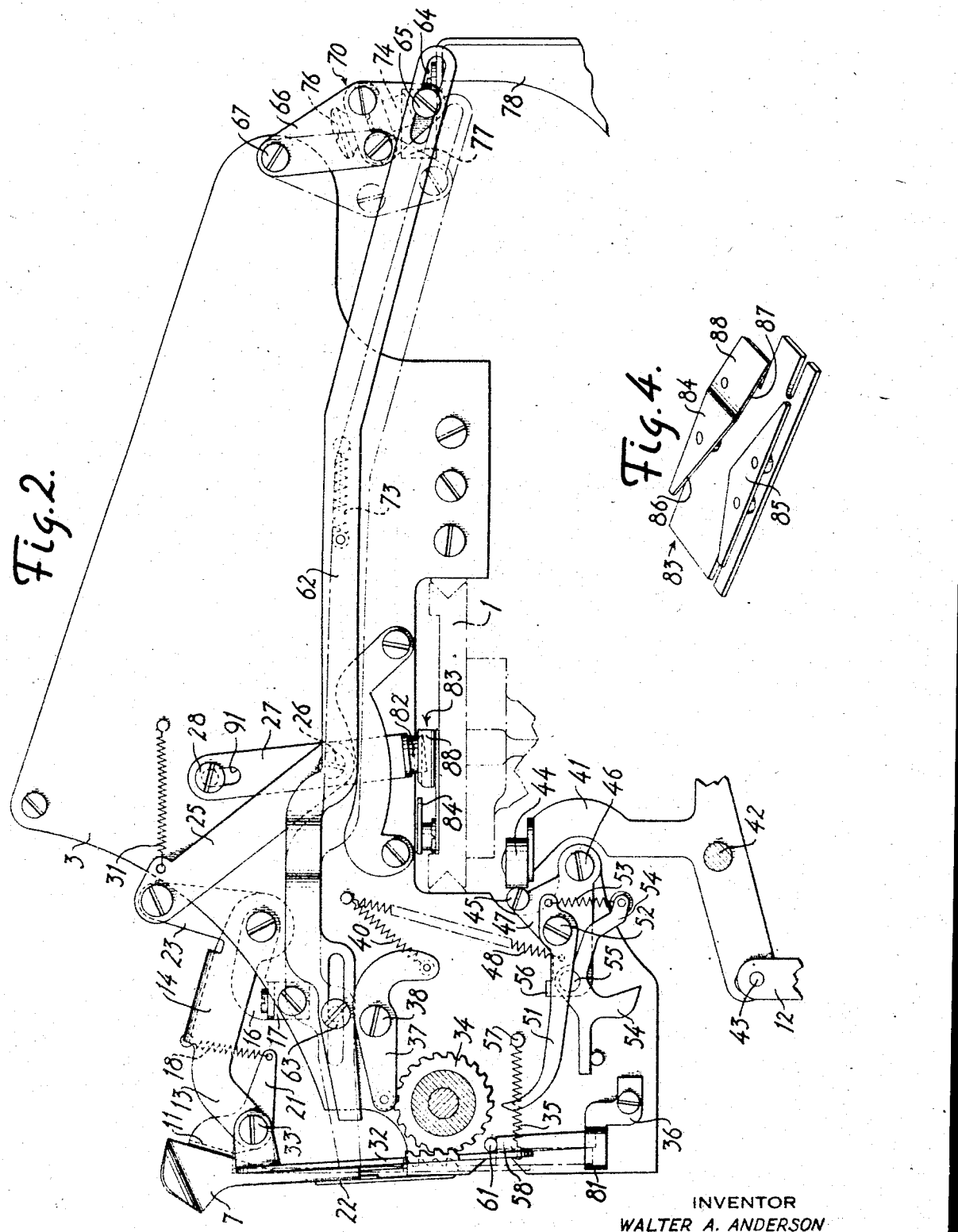
Figure 2 is a right side elevation thereof.

A cradle having rods 45 and 46 extending across the entire length of the carriage, and connected at their opposite ends by end plates such as 47, is pivoted in the carriage frame on rod 46, and is tensioned clockwise, as viewed in Figure 2, by a spring 48 fastened to the forward end of plate 47. Clockwise movement of the cradle is limited by roller 44. A line spacing finger 51 is pivoted at 52 to plate 47, and has its forward end tensioned upwardly by a spring 53 attached between the rear end of the finger and a lever 54, also pivoted on plate 47, at 55. For the purpose of the present disclosure, lever 54 may be considered only as an anchor for spring 53. Plate 47 has a flange 56 overlying the finger 51 to limit the amount of movement of the finger about pivot 52 under the tension of spring 53.

By the above described parts, the initial clockwise oscillation of bell crank 41 moves roller 44 to the right, allowing spring 48 to rock the cradle clockwise and move the forward pointed end of finger 51 upwardly and rearwardly. During this movement, finger 51 first engages ratchet 34, and then moves rearwardly under and behind the next tooth. At this time, the upper edge of the finger reaches a pin 57 fixed in carriage side wall 3. This permits continued rearward movement of finger 51 to move its forward end downwardly out of engagement with the ratchet. During the return movement of bell crank 41, the counter-clockwise movement of cradle 47 moves finger 51 forwardly, permitting finger 51 to engage ratchet 34 and rotate it one tooth space. This advances the platen one line space. Coincident with this line spacing of the platen, rack 32 and chute 7 are raised one line space under the assistance of spring 31.

4. Multiple line space advancement of forms by carriage control

Mechanism under the control of the traveling carriage is provided to disengage rack 32 from ratchet wheel 34 and thus permit the cradle 14, together with the chute 7, to swing upwardly under the tension of spring 31 until a shoulder 58 formed on the lower end of rack 32 strikes a pin 61 fixed in side wall 3, arresting the chute in the position shown in Figure 2. This amount of movement is sufficient to bring the "Balance due" line of the stub form into printing position.

The mechanism for disengaging the rack from the ratchet wheel includes a slide 62 (Figures 1 and 2) slidably mounted at its forward end upon a stud 63 fixed on carriage side wall 3. The rear end of the slide has a slot 64 through which passes a screw 65 that is secured in a depending arm 66 pivoted at 67 on side wall 3. An arm 68, corresponding to the arm 66, is similarly pivoted at 71 on the opposite carriage side wall 2, and spaced parallel rods 72 are connected at their opposite ends to the arms to complete a swinging frame structure generally indicated at 70. A spring 73, connected between slide 62 and side wall 3, normally holds the slide in its rear position where the left end of a slot in the forward end of the slide abuts stud 63, as shown in Figure 1. A roller 74, rotatably mounted on the lower one of a pair of clamping plates 75 that embrace rods 72, is adjustable along the rods by virtue of a thumb screw 76 that passes through the upper plate and threads into the lower plate.

A cam member 77 (Figures 2 and 3), mounted on a bracket 78 that is in turn mounted on the accounting machine frame, lies in the path of roller 74. When roller 74 engages cam member 77, as the carriage travels from right to left on its working stroke, frame 70 swings clockwise about pivots 67 and 71, causing screw 65 to take up the lost motion in slot 64 and thrust slide 62 forwardly. This causes the forward end of the slide to strike rack 32 and swing it forwardly, against the tension of spring 35, out of engagement with ratchet wheel 34. A flange 81 on the forward end of guide 36 limits the amount of swinging movement that may be imparted to rack 32.

Immediately upon the release of the rack from ratchet 34, spring 31 swings cradle 14 clockwise about rod 15 and raises chute 7 and rack 32 upwardly until shoulder 58 reaches pin 61. Springs 18 serve to hold the chute against the platen during this movement. Upon roller 74 moving beyond cam 77, spring 73 restores slide 62 to normal position, and during this movement the frame 70 and roller 74 are restored by spring 73 and by gravity, and rack 32 is reengaged with wheel 34 by spring 35.

The mounting of bracket 78 and details of the mounting of roller 74 upon rods 72 are disclosed in the United States application of Walter A. Anderson, Serial No. 150,367.

5. Restoring mechanism

Mechanism operable during the return stroke of the carriage restores chute 7 to the normal position shown in Figure 1. This mechanism includes a roller 82, rotatably mounted on the lower end of lever 27 and arranged to cooperate with a cam member indicated generally at 83 (Figures 2, 3 and 4) and secured on track 1. Cam member 83 carries a pair of plates 84 and 85 that define a cam track between them. Plate 84 has a tapered cam edge 86 terminating in a straight edge 87, and has an inclined surface 88 extending from the juncture of the tapered and straight edges to the right extremity of the plate. When cradle 14 swings clockwise about rod 15, following the disengagement of rack 32 from wheel 34, link 25 moves lever 27 to the rear, bringing roller 82 into alignment with the inclined surface 88 of plate 84. Hence, during the working stroke of the carriage, the roller rides up and over the plate, a slot 91 in the upper end of lever 27 permitting this rising movement. As soon as the carriage has traveled leftwardly on its working stroke a distance sufficient to bring roller 82 beyond the left extremity of plate 84, lever 27 and roller 82 drop, placing the roller in the horizontal plane of cam edge 86 of plate 84.

Upon return movement of the carriage, from left to right, roller 82 engages edge 86 and cams lever 27 clockwise about pivot 28 (Figure 2) to thrust link 25 forward against the tension of spring 31. Forward movement of link 25 rocks cradle 14 counter-clockwise about rod 15, lowering chute 7, together with rack 32, from the position shown in Figure 2 to the position shown in Figure 1. The teeth of the rack, during this movement, ratchet over the teeth of wheel 34 under the tension of spring 35, leaving the chute in readiness for the next operation.

6. Operation

Figure 3:
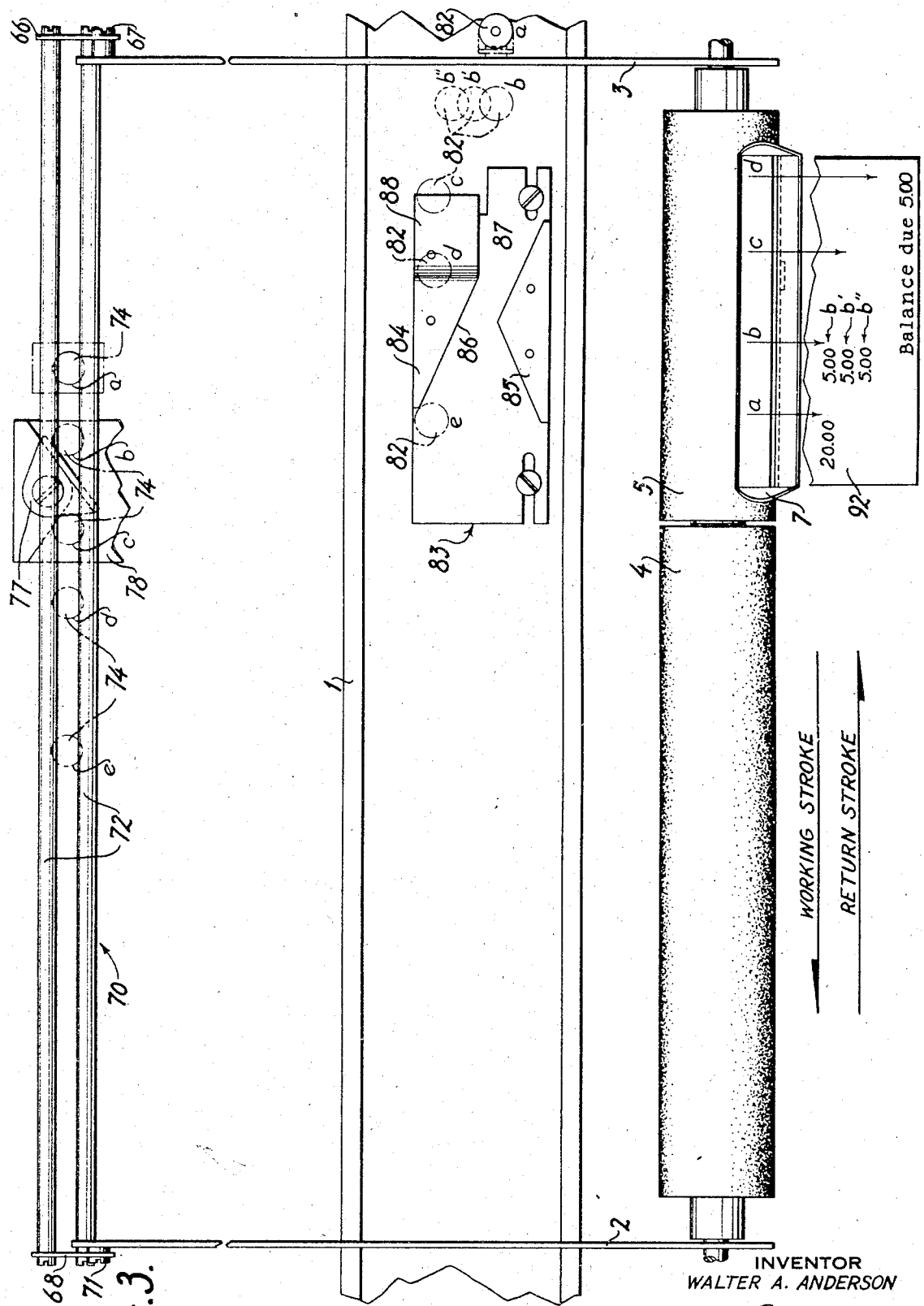
Figure 3 is a top plan view of certain elements of the invention, and illustrating, diagrammatically, the positions of certain of the control elements during the posting operations.

Referring to Figure 3, and assuming that a stub form, such as 92, has been inserted in the chute 7, and that the cariage is in the columnar position wherein the debit amounts are printed upon the form, the total debit amount of "20.00" is entered on the amount keyboard and the machine cycled in the usual manner by depressing the customary Motor bar, causing this amount to be printed, as indicated in column a of the stub form. At this time the rollers 74 and 82 occupy the positions indicated by the letter a.

Following the printing of this amount, the carriage tabulates in the usual manner to the next column b wherein a credit amount of "5.00" is indexed on the keyboard. Rollers 74 and 82 now occupy the positions indicated by the letter b. The operator, anticipating the posting of another "5.00" credit, cycles the machine to print the first "5.00" credit, by depressing the customary non-tab key. This causes platen 5 and chute 7 to advance one line space, and also causes roller 82 to be moved rearwardly to the position indicated by b'. The next "5.00" credit is then indexed and printed in the same manner, platen 5 and chute 7 being again advanced one line space.

Following the indexing on the keyboard of the last "5.00" credit, the machine is cycled by depression of the customary motor bar, and the carriage advances to the next or c columnar position. In this columnar position the machine executes a blank cycle preparatory to taking a total on the next cycle. At this time, rollers 74 and 82 occupy the positions indicated by c, the roller 74 having been thrust forward by cam 77 to disengage rack 32 (Figure 1) from ratchet wheel 34, as previously described.

Upon the completion of the blank cycle, the carriage automatically tabulates to the New balance or d columnar position. During this travel the roller 82 is raised by the inclined surface 88 of cam plate 84. The "Balance due" is now printed at the bottom of the stub. Upon the completion of this operation, the carriage is tabulated farther to the left on its working stroke until rollers 74 and 82 occupy the positions indicated at e, where the carriage return mechanism becomes effective to return the carriage to the starting position indicated at a.

During the return movement, roller 82 is engaged by cam edge 86 to restore chute 7 to the starting position shown in Figure 1, and roller 74 is permitted to ride idly past the rear of cam 77 by virtue of the slot 64 in slide 62. During the return movement, the completed stub may be removed and a new one inserted for the next posting operation. The "Balance Due" line of the stub form will always be brought into printing alignment during the blank cycle in the c column, irrespective of the number of credits printed in the b column, since during the carriage tabulation from the b to the c column, roller 74 is thrust forward by cam 77, releasing chute 7 for the relatively long feed movement under the tension of spring 31.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, a traveling carriage having a platen, a work sheet support mounted above the platen, means to raise the work sheet support single line space distances, means to move the carriage laterally, and means, controlled by the lateral movement of the carriage, to thereafter raise the work sheet support a multiple line space distance.

2. In a machine of the class described, a traveling carriage having a platen, a work sheet support mounted above the platen, means to impart single line space movements to the work sheet support, means to move the carriage laterally, means, controlled by the lateral movement of the carriage, to thereafter impart a multiple line space movement to the work sheet support, and an additional means, controlled by movement of the carriage, to restore the work sheet support to its original position.

3. In a machine of the class described, a traveling carriage having a platen, a work sheet support mounted above the platen, means to impart single line space movements to the work sheet support, means to move the carriage laterally, means to impart a multiple line space movement to the work sheet support, and means, operated when the carriage moves through a predetermined position, to release the multiple line spacing means for operation.

4. In a machine of the class described, a traveling carriage having a platen, a front feed work support, machine operated means for adjusting the position of the work support distances sufficient for single space line feeding, and machine operated means for thereafter adjusting the position of the work support a distance sufficient for a multiple space line feeding.

5. In a machine of the class described, a traveling carriage having a platen, a work sheet support, means to move the work sheet support lineal distances corresponding to single line spaces, means to move the carriage through its travel, and means controlled by the carriage to thereafter move the work sheet support to a predetermined position.

6. In a machine of the class described, a traveling carriage having a platen, a front feed work support, machine operated means for raising the work support single line space distances, means to move the carriage through its travel, and means controlled by the carriage to thereafter raise the work support a multiple line space distance.

7. In a machine of the class described, a traveling carriage having a platen, a front feed work support, means for raising the work support single line space distances, means to move the carriage through its travel, and carriage controlled means to thereafter raise the work support to a predetermined position.

8. In a machine of the class described, a traveling carriage having a platen, a front feed work support, means for raising the work support single line space distances, means to move the carriage through its travel, carriage controlled means to thereafter raise the work support to a predetermined position, and additional carriage controlled means to return the work support to its original position.

9. In a machine of the class described having a traveling carriage carrying a platen, the combination of a chute on the carriage for supporting work sheets from in front of the platen, mechanism for rotating the platen step by step for line spacing, means normally tending to move the chute a multiple line space distance, means connected to the chute and to the line space mechanism to normally hold the chute against the multiple line space movement, said connecting means being operable by the line space mechanism to impart single line space movements to the chute coincident with the step by step rotation of the platen, means to move the carriage through its travel, and means controlled by movement of the carriage to free the holding means from the line space mechanism to enable the multiple line space moving means to impart a multiple line space movement to the chute.

10. In a machine of the class described having a traveling carriage carrying a platen, the combination of a chute on the carriage for supporting work sheets from in front of the platen, mechanism for rotating the platen step by step for line spacing, means normally tending to move the chute a multiple line space distance, means connected to the chute and to the line space mechanism to normally hold the chute against the multiple line space movement, said connecting means being operable by the line space mechanism to impart single line space movements to the chute coincident with the step by step rotation of the platen, means to move the carriage through its travel, means controlled by movement of the carriage to free the holding means from the line space mechanism to enable the multiple line space moving means to impart a multiple line space movement to the chute, and additional means controlled by movement of the carriage to restore the chute to normal position.

WALTER A. ANDERSON.